United States Patent
Edgarian et al.

(10) Patent No.: US 10,953,815 B2
(45) Date of Patent: Mar. 23, 2021

(54) MODULE AND SUPPORT STRUCTURE ASSEMBLY

(71) Applicant: Aptiv Technologies Limited, St. Michael (BB)

(72) Inventors: Robik Edgarian, Wuppertal (DE); Ravindra Kulkarni, Bangalore (IN)

(73) Assignee: Aptiv Technologies Limited, St. Michael (BB)

( * ) Notice: Subject to any disclaimer, the term of this patent is extended or adjusted under 35 U.S.C. 154(b) by 0 days.

(21) Appl. No.: 16/257,431

(22) Filed: Jan. 25, 2019

(65) Prior Publication Data

US 2019/0248301 A1   Aug. 15, 2019

(30) Foreign Application Priority Data

Feb. 15, 2018 (EP) .................................. 18156973

(51) Int. Cl.
*B60R 11/04* (2006.01)
*H04N 5/225* (2006.01)
*B60R 11/00* (2006.01)

(52) U.S. Cl.
CPC .......... *B60R 11/04* (2013.01); *H04N 5/2252* (2013.01); *B60R 2011/0026* (2013.01); *B60R 2011/0071* (2013.01); *B60R 2011/0073* (2013.01)

(58) Field of Classification Search
CPC ............. B60R 11/04; B60R 2011/0026; B60R 2011/0071; B60R 2011/0073; H04N 5/2252; H04N 5/2257; F16B 2/245; F16B 2001/0092
USPC .................................................. 224/482–483
See application file for complete search history.

(56) References Cited

U.S. PATENT DOCUMENTS

| 8,213,164 | B2 * | 7/2012 | Benbrahim | G06F 1/16 361/679.01 |
| 9,871,971 | B2 * | 1/2018 | Wang | H05K 999/99 |
| 10,207,654 | B2 * | 2/2019 | Edgarian | B60R 11/04 |
| 2013/0015288 | A1 * | 1/2013 | Hernandez | F16L 3/243 244/3.1 |

(Continued)

FOREIGN PATENT DOCUMENTS

DE   10 2013 005801 A1   10/2014
WO   2013/123161 A1   8/2013

OTHER PUBLICATIONS

"DE102013005801 Machine Translation", from espacenet.com, retrieved Jan. 29, 2020. (Year: 2014).*
European Search Report dated Jun. 6, 2018.

*Primary Examiner* — Adam J Waggenspack
(74) *Attorney, Agent, or Firm* — Colby Nipper PLLC

(57) ABSTRACT

A module and support structure assembly, in particular for mounting on the windscreen of a passenger compartment of an automotive vehicle, that includes: a module having a housing; and a support structure adapted to carry the module, the housing and support structure comprising respective first and second fixation members cooperating with each other for releasable fixing, in particular by snapping, the module to the support structure. The housing and support structure further comprise cooperating positioning members that are configured to define a receiving position for the module on the support structure, in which the module is not fixed, and to assist in a guided fashion engagement of the first and second fixation members to bring the module in a fixed position.

11 Claims, 9 Drawing Sheets

(56) References Cited

U.S. PATENT DOCUMENTS

2016/0023620 A1* 1/2016 Matori .................... B60R 11/04
                                                        348/148
2016/0229355 A1* 8/2016 Hayashi ............... G01D 11/245
2019/0351840 A1* 11/2019 Kasarla .................. B60R 11/04

* cited by examiner

MODULE AND SUPPORT STRUCTURE ASSEMBLY

TECHNICAL FIELD OF INVENTION

The present invention generally relates to a module and support structure assembly. The invention relates in particular to a support structure with mounting bracket for a vehicle windscreen and adapted for releasable fixing a module such as a camera or other accessory.

BACKGROUND OF INVENTION

Automobile vehicles which provide driving assistance are generally constructed with vision systems. For advanced driving assistance, vision systems can be installed in the passenger compartment. For example, a camera can be arranged behind the windscreen in order to make the road visible. Typically, the camera is mounted on a support or bracket, which is then fixed to the windscreen. The driving assistance requires a robust construction of the camera mounting system to be secure and ensure safety of the passengers, especially in case of crash. However, the camera mounting system shall not be a permanent fixation in order to allow the removal of the camera, for example for maintenance. Clipping systems (namely snap fit systems) have therefore been used to facilitate the locking of the camera on the platform.

WO 2013/009368 A1 discloses a retention system, on a mounting structure, for a generally cylindrical component, the retention system comprising: a generally U-shaped metal spring clip comprising a base and a pair of symmetric resilient retainer arms extending from the base and defining an inlet passage; and a member holding the U-shaped spring clip. The retainer arms have a substantially arcuate shape (hourglass-shaped profile), so that each retainer arm contacts the component over a substantial peripheral region, which allows securing the component between the retainer arms.

Current issues with known mounting brackets are the fragility of the releasable fixtures, which may not resist several mounting/dismounting required for maintenance, or may be damaged by a miss-assembly. In some designs, the locking grooves of the fixtures are oriented downwards, facilitating the detachment of the module on used mounting brackets.

Another camera mounting assembly is disclosed in EP 3 258 119. The mounting bracket disclosed therein has an improved retainer design with a metallic spring clip that has proved very robust in practice. Indeed, it allows detaching the camera from the mounting bracket several times, without risking damaging the retainers.

SUMMARY OF THE INVENTION

Described herein is a module and support structure assembly that permits a handy and reliable fixing of the module, while being releasable.

According to the present invention, a module and support structure assembly comprises a module having a housing; and a support structure adapted to carry said module, the housing and support structure comprising respective first and second fixation members cooperating with each other for releasable fixing, in particular by snapping, the module to the support structure.

It shall be appreciated that the housing and support structure further comprise cooperating positioning members that are configured to define a receiving position for the module on the support structure, in which the module is not fixed, and to assist in a guided fashion engagement of the first and second fixation members to bring said module in a fixed position.

In the present invention, the locking movement of the module is thus carried out in an assisted/guided manner, which ensures a proper engagement of the cooperating releasable fixation members. This is permitted by the positioning members, which not only accompany the engaging movement of the positioning members in all directions, and hence reduce the risk of damage, but also acts as a first fool-proof (poke-yoke) means. Indeed, bringing the module in the receiving position needs a proper orientation of the module, avoiding miss-assemblies. The positioning means are further of advantage in circumstances where the access to the support structure is not comfortable and the operator does not readily have a view on the parts. Here, once the operator has brought the module on the support structure in receiving position, he is confident that the cooperating fixation members can be properly engaged, as well as disengaged. Hence the present invention offers a handy and reliable assembly design.

The present invention has been particularly developed for application in automotive vehicles, e.g. for modules such as cameras, vision systems in general or other accessories, that may need to be securely and detachably fixed in the vehicle (in the passenger compartment or in the engine or trunk). In particular, the present design allows a plurality of mounting/dismounting of the module/camera on the support structure, as required e.g. during servicing (e.g. annual servicing) of a vehicle, where the windscreen can be more easily cleaned after removal of the camera. It will however be apparent that the invention can be transposed to a variety of application where a module with any functionality needs to be assembled to a support structure.

The positioning members may comprise a protrusion and a cavity, the protrusion being capable of rotation in the cavity so that the module is brought by pivoting about a rotating axis from the receiving position into the fixed position. Preferably the cavity is provided in the support structure and the housing comprises a positioning pin fitting into the cavity. In the receiving position the pin is within the cavity, so that it suffices to rotate/twist the module from the receiving position to engage the cooperating fixation members and bring the module in the fixed position. If desirable, the positioning cavity may comprise a snap-fit function to compensate for tolerances.

The positioning members are beneficial in that they provide a first level of poke-yoke by defining a predetermined position in which the module is to be oriented on the support structure. Furthermore, they ensure that the displacement movement required to engage the cooperating fixation members is properly carried out, reducing risks of damaging the latter. The fixation members being releasable, the positioning members also assist for the release/unlock movement of the camera.

Advantageously, poke-yoke means are further provided, which include at least one guide feature on the support structure that limits the angular displacement of the module on the support structure, and thereby defines the angular position corresponding to the receiving position. One or more guide features may be provided on the support structure and may take any appropriate form. Conveniently a pair of positioning walls are arranged on the support structure and spaced to accommodate the module, the positioning member of the support structure being located in-between the guide walls or separating one of the guide walls in two portions. This prevents any initial miss-assembly of the module on the support structure to reach the receiving position.

The releasable fixation members may include a pin and a groove with snap-fit function. The groove is preferably arranged on the support structure and the pin is provided on the module, although the contrary is possible. The pin preferably extends in a direction transversal (i.e. angled), in particular perpendicular, to the rotation axis of the positioning members. Alternatively the pin may be parallel to the rotation axis.

In embodiments, to further support the module, the latter is provided with a further pin that is engaged, in the fixing position, in a groove of a supporting member (which may by designed as groove of a fixation member with snap-fit function).

The combination of pin and snap-fit groove is conveniently used for its ease of manufacturing, and since it provides an easily engageable releasable fixture, in particular through the rotating movement imparted to the module. The snap-fit groove is easily formed by a plastic or metallic C or U shaped element having appropriate resilience or elasticity. Those skilled in the art will however appreciate that this is not critical and that a variety of releasable fixation members can be envisaged, with any appropriate shape and design, based on snap-fit, interference-fit, flexible/elastic fit or friction fit.

A minimum of one set of cooperating releasable fixation members is required so that there is at least one fixation point of the module to the support structure. However more fixation points can be used, with heavier modules.

When the module comprises two pins, they are preferably provided on opposite portions of the housing and extend along a respective axis transverse to said rotation axis, preferably perpendicular thereto, or can be both parallel to the rotation axis. The corresponding grooves are advantageously oriented such that their openings look in opposite directions, E.g. backwards and rearwards in a car. In doing so, there is one groove looking opposite to a crash direction, reducing the risk of camera popping out.

In embodiments, the support structure comprises a platform with the fixation member(s), respectively the support member, and guide walls, wherein the rotation axis is substantially perpendicular to the platform and wherein the grooves have an inlet region oriented such that it lies in a plane parallel to the platform. The pins are preferably arranged to extend along a same axis that passes through the positioning cavity for perfect turning.

In use, the platform is preferably substantially horizontally arranged (although any configuration is possible). The present assembly can be adapted for mounting to any kind of surface, in particular with any inclination (namely any rake angle of a vehicle windscreen). The support structure may comprise a bracket portion, in particular connected to the platform, for mounting to an external structure, in particular to a vehicle windscreen. The bracket portion is configured so that in use, the platform preferably lies within +/−30° from the horizontal, more preferably +/−10°, even more preferably less than 5°. The platform can e.g. also be directly affixed to a horizontal surface.

In many applications, as is the case for cameras, the module may have a generally rectangular housing with front and rear faces, lateral edges and top and bottom edges. The pins may protrude on opposite lateral edges. Alternatively the pins may be arranged to protrude from the front and rear faces. the positioning pin may be arranged to protrude beyond the top edge. In embodiments, depending on the space available on the support structure, the positioning pin is arranged on a tab protruding from the rear face.

Further features and advantages will appear more clearly on a reading of the following detailed description of the preferred embodiment, which is given by way of non-limiting example only and with reference to the accompanying drawings.

BRIEF DESCRIPTION OF DRAWINGS

The present invention will now be described, by way of example, with reference to the accompanying drawings, in which.

DETAILED DESCRIPTION

Figure 1:
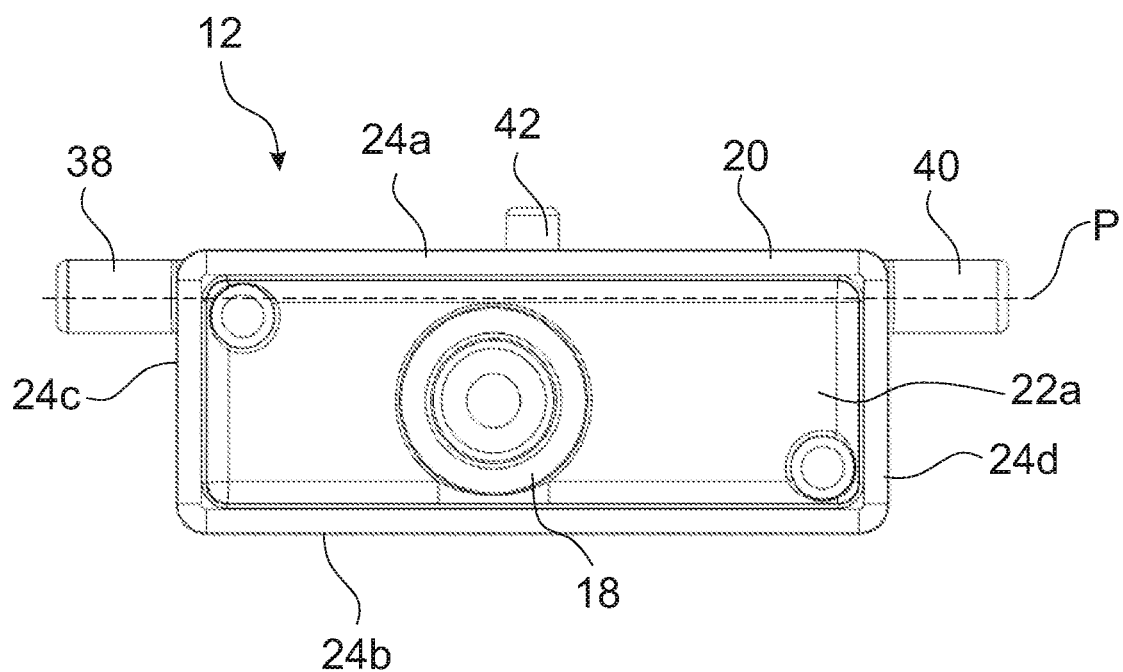
FIG. 1 is a front view of the camera in a first embodiment.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

'One or more' includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for describing embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Several embodiments of the present invention will now be described in relation to an application to automotive vehicles, wherein the module is a camera to be mounted onto the inner side of a windscreen of a passenger compartment.

In the drawings, the longitudinal, transversal and vertical axes (X, Y, Z) are presented mainly for ease of explanation. The same applies to the terms "upper" and "lower", which refer to the orientation in the figures.

Figure 2:
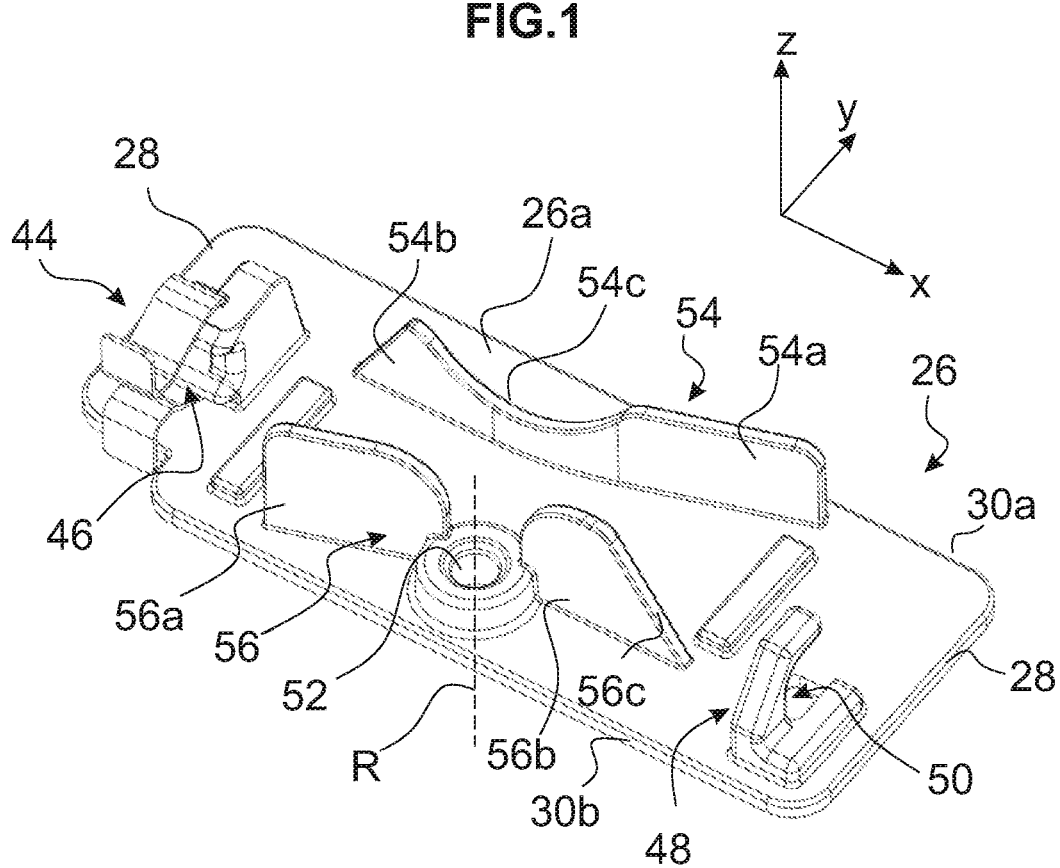
FIG. 2 is a perspective view of the platform (seen from camera mounting side)
Figure 3:
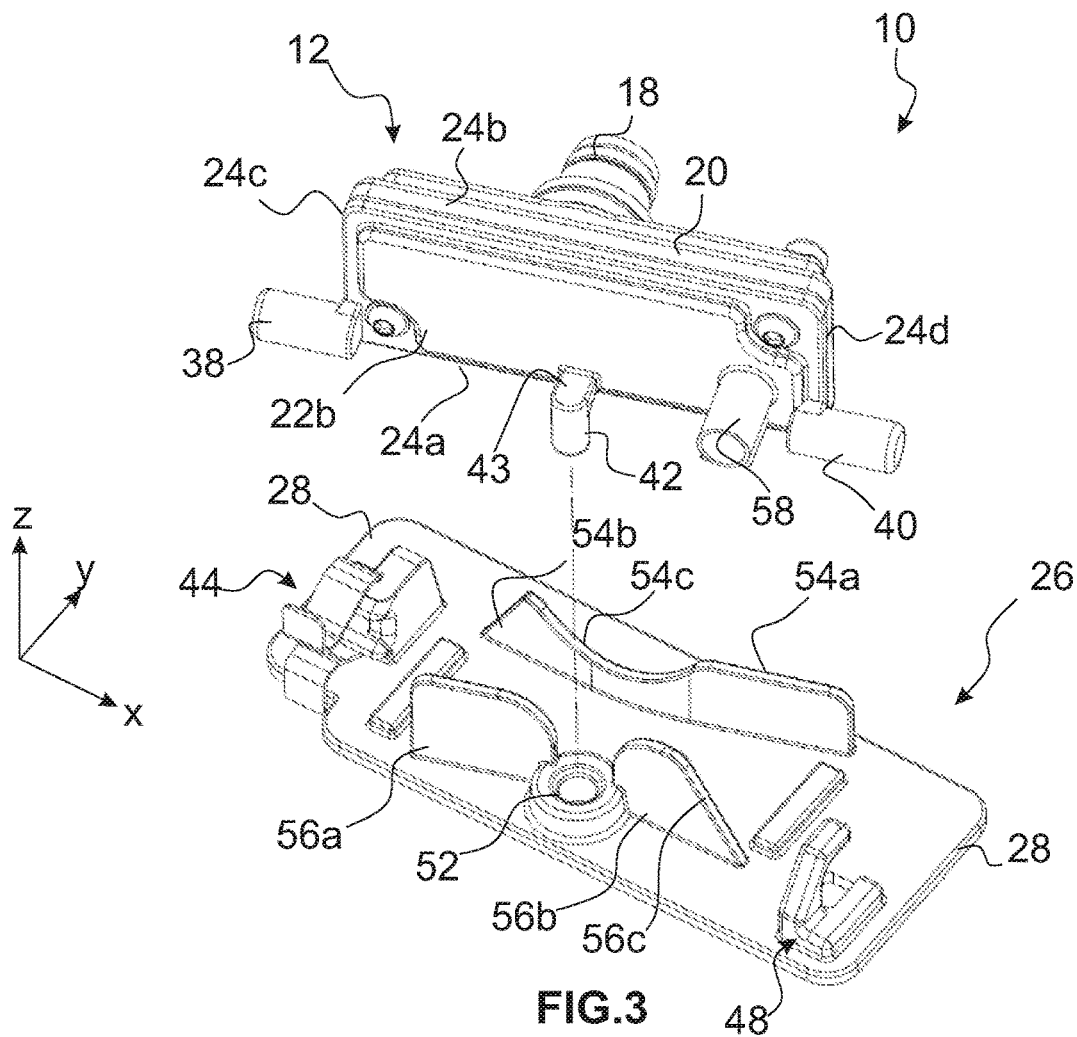
FIG. 3 is a perspective view showing the positioning members of the camera and platform in alignment.
Figure 4:
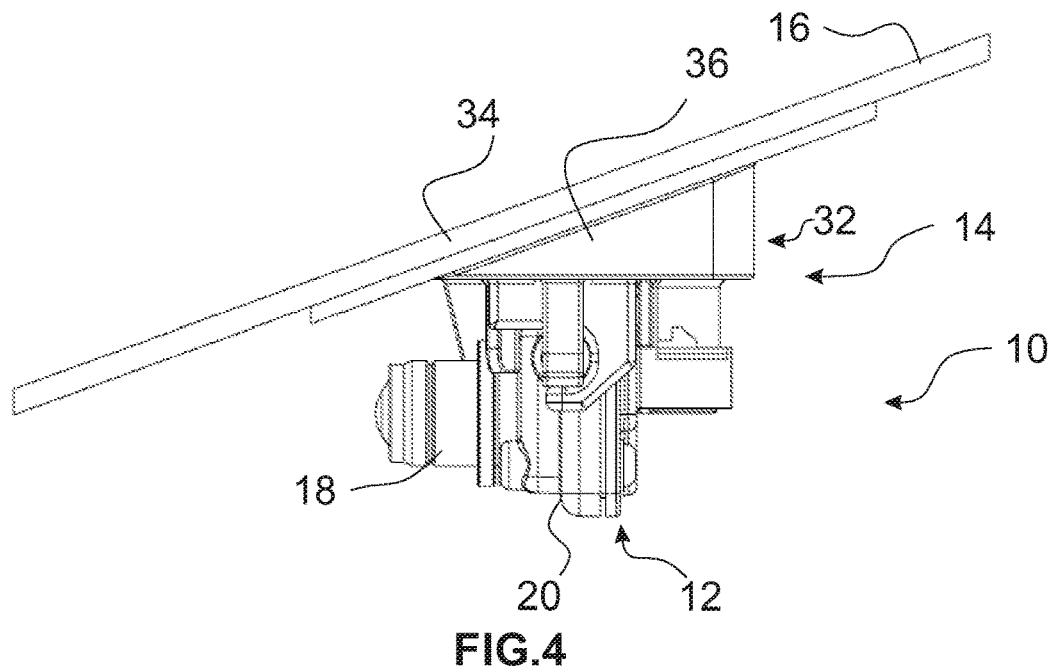
FIG. 4 is a side view of the camera assembly as affixed to the inner side of a vehicle windscreen.

A first embodiment of an assembly 10 is shown in FIGS. 1 to 8. In FIG. 4 the module/camera 12 is fixed to a support structure 14 formed as mounting bracket attached to the inner side of a vehicle windshield 16. The camera 12 is here represented in the "use" position, with its camera lens (objective) 18 turned towards the windscreen 16, i.e. looking to the front of the vehicle.

In this embodiment the camera 12 has a generally rectangular housing 20 with opposite front and rear sides 22a, 22b as well as top, bottom and lateral edges 24a, 24b, 24c, 24d.

FIG. 2 shows a receiving platform 26 of the support structure 14 that is configured to carry the camera 12 on a receiving side 26a. In this embodiment, the platform 26 is a generally rectangular plate having lateral edges 28 (transverse direction Y) connecting front and rear edges 30a, 30b (running in longitudinal X direction). The platform 26 is rigidly attached to a mounting portion 32 for mounting to the windscreen. The mounting portion 32 extends at the rear of the platform 26, opposite receiving side 26a. As illustrated in FIG. 4, the mounting portion 32 includes a base plate 34 to be affixed, e.g. by gluing, to the windscreen 16 and support walls 36 that connect the platform 26 to the base plate 34.

The mounting portion 32 is advantageously configured so that the platform 26 lies generally horizontally in use (X, Y plane), as shown in FIG. 4. Therefore, the walls 36 connecting the base plate 34 to the platform lateral edges 28 are of triangular shape, tapering from rear to front. However, depending on the application and embodiment, the platform 26 may lie at other angles.

The platform 26 is provided on its receiving side 26a with releasable fixation means and positioning means designed to cooperate with corresponding means on the camera housing 20.

Advantageously, the fixing and positioning members on the camera take the form of protruding, generally cylindrical components referred to as pins. Referring to FIG. 1, two pins 38 and 40 are arranged to protrude from the lateral edges 24c and 24d of the housing 20. They are preferably aligned on a same axis P. In the shown embodiment, the pins 38, 40 are slightly offset from the rear face 22b and positioned at the height of the upper corners. The positioning pin 42 protrudes upwardly beyond the top edge 24a. It here extends from a lug 43 attached to the rear housing side 22b. In the view of FIG. 1 the camera is oriented as in FIG. 4 (use configuration). As will be understood, the axis P of the lateral pins 38, 40 is thus substantially horizontal, whereas the positioning pin extends perpendicularly to axis P and thus vertically in use (parallel to axis Z). In FIGS. 2, 3, 5 and 6 the camera 12 is thus shown upside down, as well as the platform 26, for ease of representation and explanation.

Turning back to FIG. 2, reference sign 44 designates a releasable fixation member that defines a snap-fit receiving groove 46 adapted to hold lateral pin 38. Fixation member 44 is arranged about one lateral edge 28 of the platform 26. At the opposite end is a support member 48 that comprises a groove 50 adapted to receive the opposite lateral pin 40.

The positioning means include a positioning cavity 52, typically a cylindrical bore (e.g. formed by a sleeve) arranged through the platform 26 and defining a rotation axis R for the positioning pin 42.

As explained above, in use the platform preferably lies substantially horizontal. The positioning bore 52 thus extends substantially vertically to define a vertical rotation axis R (parallel to Z axis) for positioning pin 42. Also to be noticed, since the lateral pins 38 and 40 are on axis P, the grooves 46 and 50 are also aligned.

Remarkably, the positioning means are configured to define a receiving position for the camera 12 on the support structure (respectively platform 26), in which the camera 12 is not fixed, and to assist in a guided fashion engagement of the pins 38 and 40 with the respective grooves 46 and 50 defined by the fixation member 44 and support member 48, in order to bring the camera in a fixed position.

Figure 5:
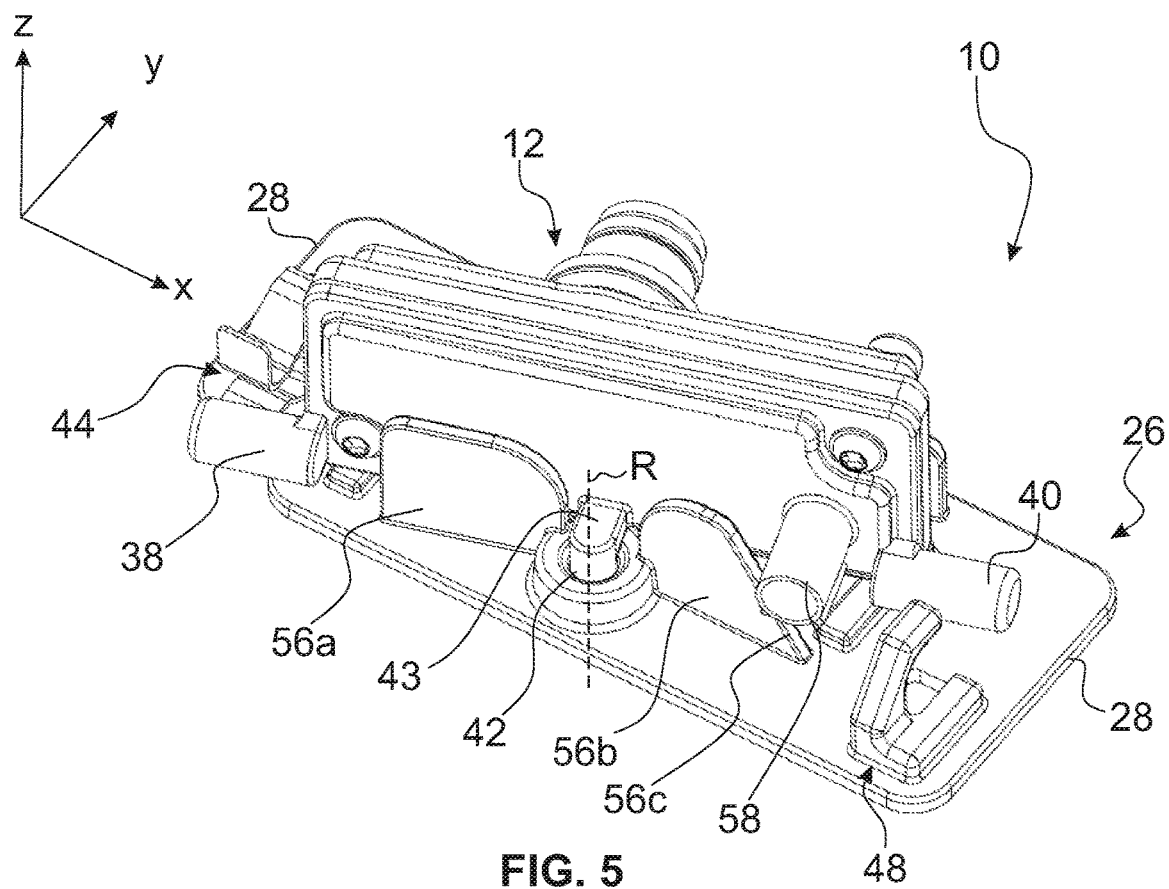
FIG. 5 is a perspective view of the camera in the receiving position on the platform.

Turning now to FIGS. 3 and 5, the assembly procedure of the camera 12 on the platform 26 starts with introducing positioning pin 42 into positioning cavity 52. The positioning cavity 52 permits accurately positioning the camera 12 on the platform 26 before engaging the pins 38 and 40 in their respective grooves. In the configuration shown in FIG. 5, the positioning pin 42 is inside positioning cavity 52 and camera 12 is in contact with the platform 26; the pins 38 and 40 are facing the grooves 46 and 50 and ready to be engaged therein: this is the receiving position.

Figure 6:
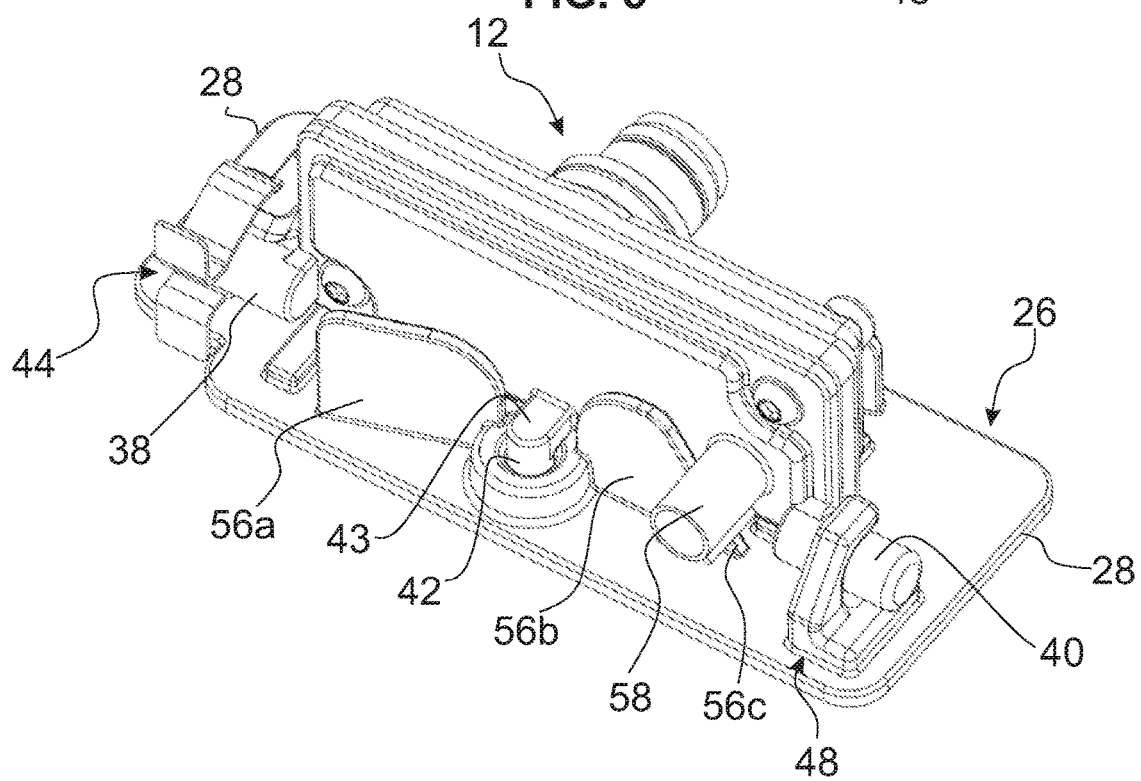
FIG. 6 is a perspective view of the camera in the fixed position on the platform.

As will be understood from FIG. 5, rotating the camera about axis R (from the receiving position) towards the fixation and support members 44, 48 (i.e. here clockwise)

will permit engaging the lateral pins 38, 40 into the respective grooves. The resulting fixing position is illustrated in FIG. 6. Since the fixation member cavity is designed as snap-fit retainer, it will allow, upon overcoming an entry force, to securely hold the lateral pin in position. In the present embodiment, the fixation member includes a metal clip whereas the support member is simply designed as a U-shaped cavity. The latter will be described in more detail below.

It may however be noticed that the respective inlet openings of both grooves 46 and 50 are opposed to one another. That is, the inlet passage of the metal clip 60 is facing, in use, the interior of the car, whereas the opening of the support member groove 50 is turned toward the windscreen. This configuration is only exemplary. In practice the fixing and support members may actually be inverted, so that the metal clip opening looks towards the windscreen and the support members looks rearwards.

In order to further assist in the guidance during camera assembly, a pair of guide walls are advantageously provided on the platform, which act as poke-yoke means. The front and rear guide walls 54, 56 extend generally along the length direction (X direction) of the platform and are positioned to form stop surfaces for the camera 12 in the receiving and fixing positions. The guide walls 54 and 56 may generally be upright walls, i.e. substantially perpendicular to the platform plane.

The rear guide wall 56 comprises two wall portions 56a and 56b extending on both sides of the positioning bore 52. It can be noticed that the wall edges adjacent the positioning bore 52 are rounded to provide smooth guidance when approaching the positioning pin 42 of the bore 52. A first wall portion 56a defines the angular position of the camera housing in the receiving position, as seen in FIG. 5. In the fixed position, the camera housing 20 is aligned with the second rear wall portion 56b. Also to be noted here is the slanted external edge 56c of second wall portion 56b for the passage of a connector 58 protruding from the rear side 22b of the camera.

In a similar manner, front guide wall 54 also comprises two portions. A first portion 54a oriented approximately similar to the first portion 56a of the rear wall, delimits the angular displacement in the receiving position. The second portion 54b corresponds to the fixing position. The upper 54c edge of the second wall is arc-shaped to accommodate the lower part of the camera lens 18. It may be noted that guide walls 54 and 56 further assist in maintaining the camera in place in case of crash.

Figure 7:
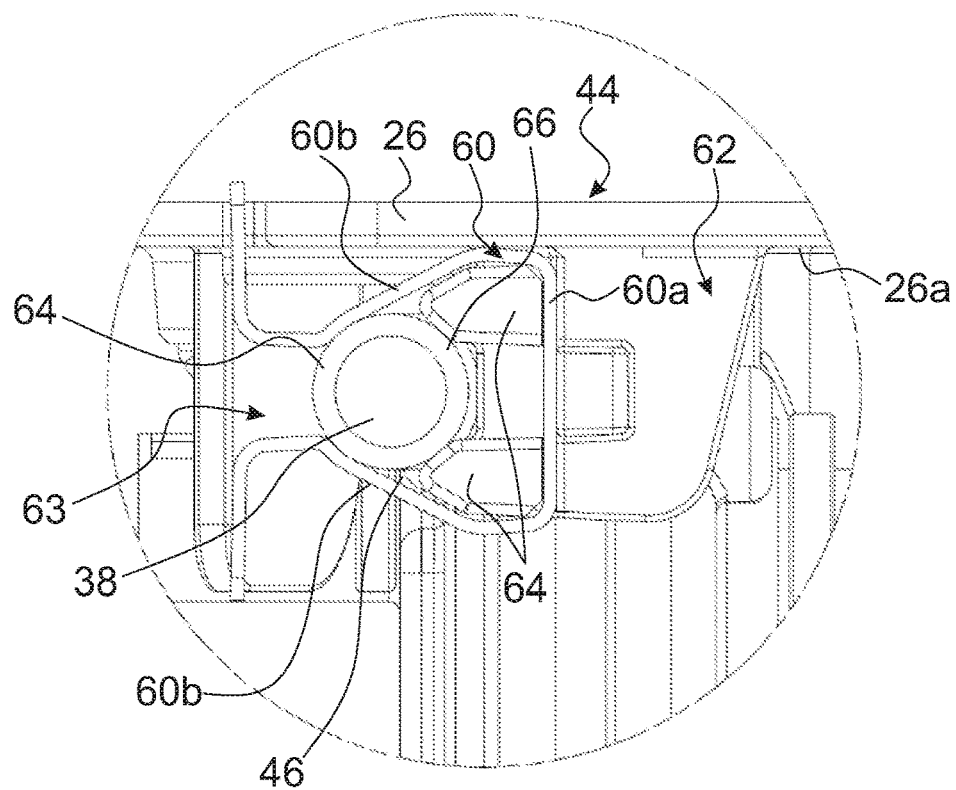
FIG. 7 is a detail of an embodiment of snap fit fixation member.

Turning now to FIG. 7, the fixation member 44 of platform 26 is illustrated in detail. It is designed as a retainer system with a generally U-shaped spring clip 60 mounted on a holding member 62 attached to the platform 26. Spring clip 60 comprises a base 60a and a pair of resilient retainer arms 60b, which define an inlet passage 63 and form the retainer groove 46. It can be observed here that the inlet 63 of groove 46 is oriented such that it lies in a plane parallel to platform 26. Engagement of pin 38 occurs by moving the latter along said plane in the groove 46.

The retainer arms 60b are adapted to engage with a first side 64 of the camera pin 38 that faces the inlet passage 63. Holding member 62 comprises one rigid retention wall or multiple rigid retention walls—here two walls 64, which extend inside the spring clip 60 and are adapted to engage with the opposite second side 66 of pin 38 at distance from the clip base 60a. The configuration shown in FIG. 7 corresponds to the working position of the retention system: it is the stable position in which the fixing pin 38 is securely retained by the spring clip 60. In working position, the pin 38 is locked in place at its periphery by the resilient arms 60b pressing the pin 38 against the retention walls 64. This retainer system is disclosed in more details in EP 3 258 119.

Figure 8:
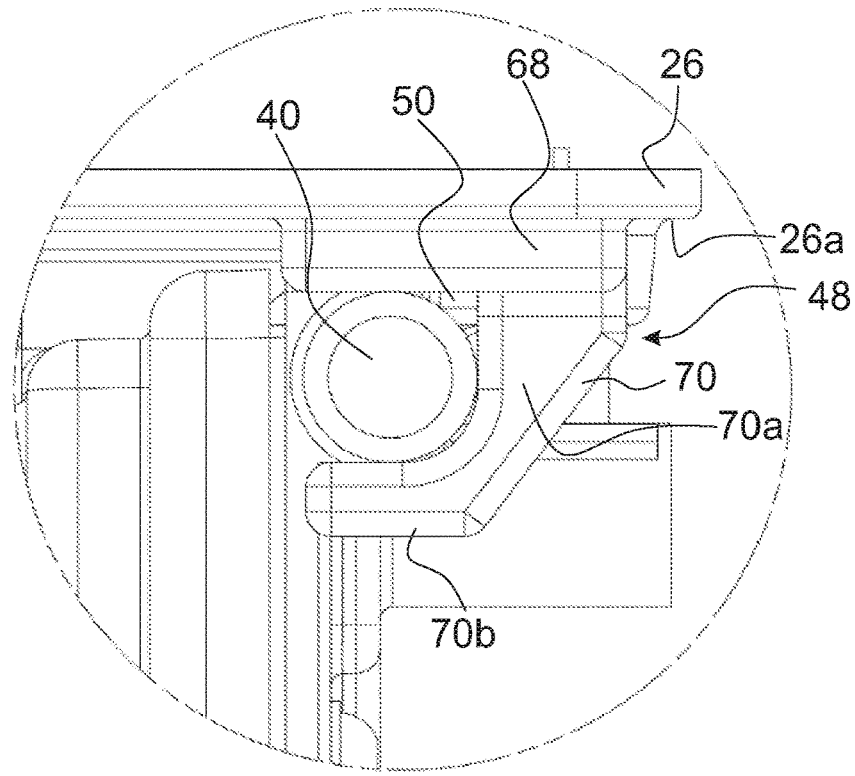
FIG. 8 is a detail of the support member.

The support member 48, shown in detail at FIG. 8, is here simply designed as a U-shaped groove 50 to support the opposite lateral pin 40. It comprises a base 68 attached to the platform 26 and a bent finger 70 having a raised portion 70a and a terminal 70b portion running parallel to the base 68. The inner dimensions of the U-shaped groove are selected to accommodate the corresponding lateral pin 40 with some operational play. Here again the inlet of groove 50 is oriented such that it lies in a plane parallel to the platform 26.

Figure 18:
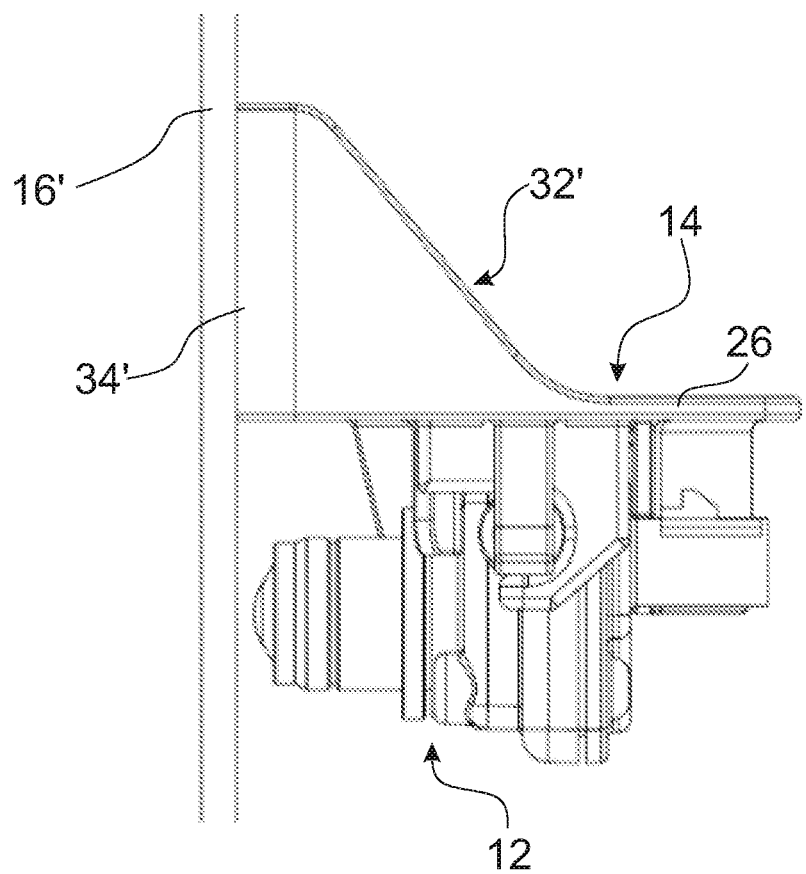
FIG. 18 is a side view the camera assembly as affixed to the inner side of a vehicle windscreen with a rake angle of 90°.

It may be noted at this point that whereas in FIG. 4 the mounting portion 32 is configured for mounting on a windscreen with an intermediate range of rake angle, the present design can easily be adapted to any angle of window or wall. This is done by modifying the configuration of the mounting portion 32 at the rear of the platform. Referring to FIG. 18, mounting portion 32' is configured to connect the horizontal 26 platform to the base plate 34' that is arranged at 90° with respect to the platform, allowing for mounting onto a vertical window 16' or wall.

Figure 17:
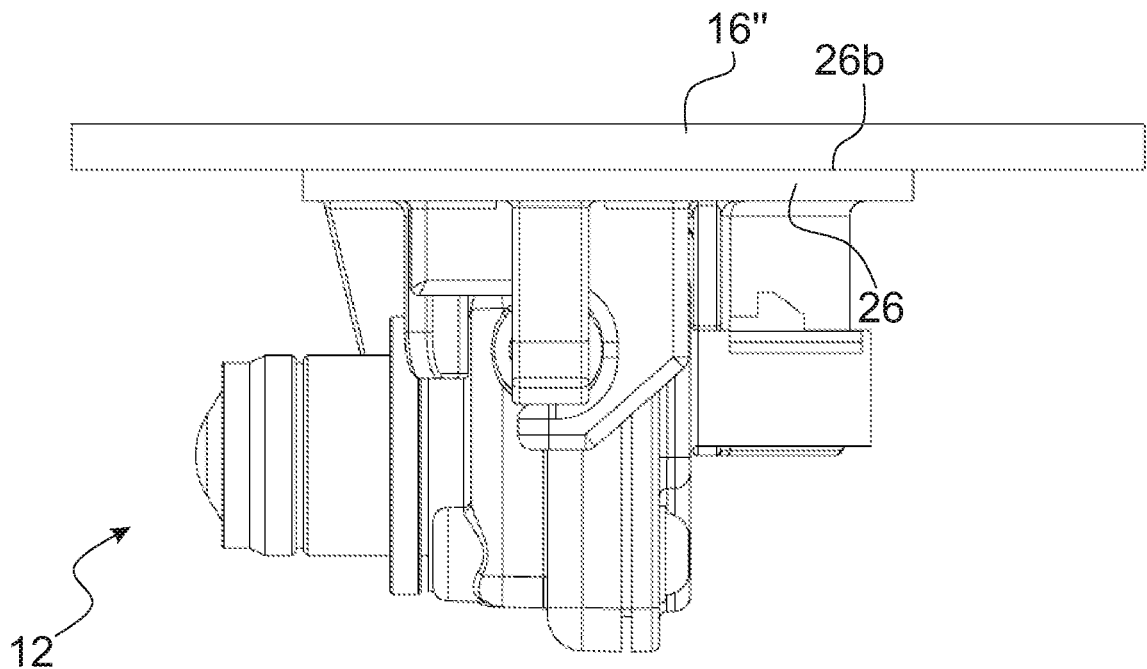
FIG. 17 is a side view the camera assembly as affixed to the inner side of a vehicle windscreen with a rake angle of 0°.

In FIG. 17 the platform 26 is directly applied by its rear side 26b, opposite camera side 26a, to a horizontal window 16".

An alternative design of the platform will now be explained with reference to FIGS. 9 to 14. Having regard to the previous embodiment, same or similar elements are indicated by same reference signs, augmented by 100.

Figure 9:
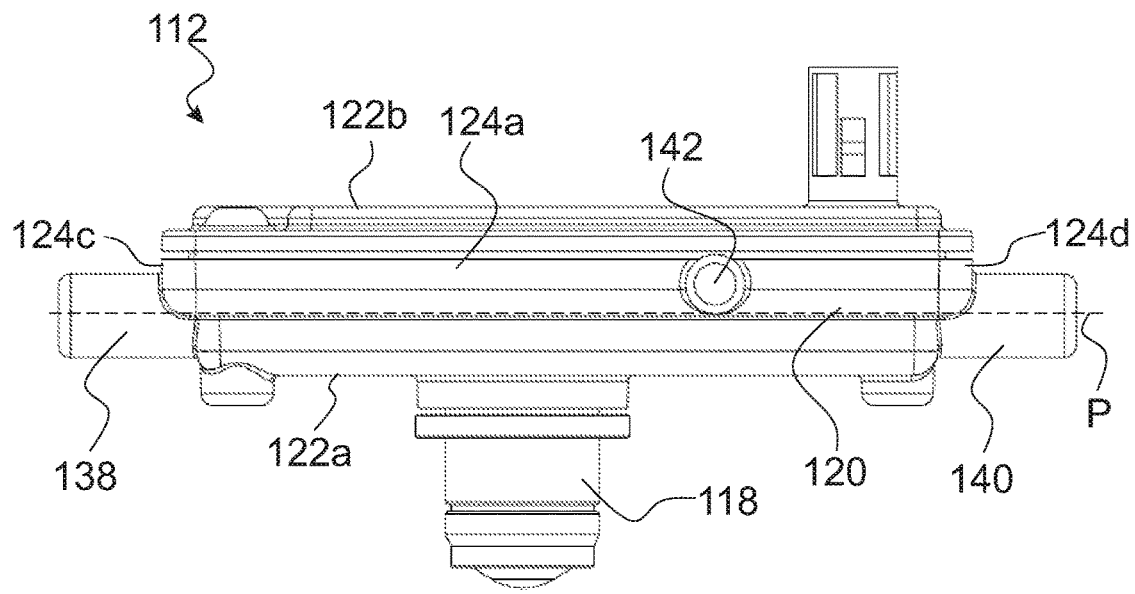
FIG. 9 is a top view of the camera in a second embodiment.

Referring to FIG. 9, the lateral pins 138 and 140 are arranged to protrude from the lateral edges but do not protrude from the front or rear sides (i.e. they are not offset as in the first embodiment). Similarly the positioning pin 142 is arranged to protrude directly from the top edge 124a, and here is actually at mid-distance from the front and rear sides. As compared to the previous embodiment, positioning pin 142 is closer to one lateral edge (the right edge 124d in FIG. 9).

Figure 10:
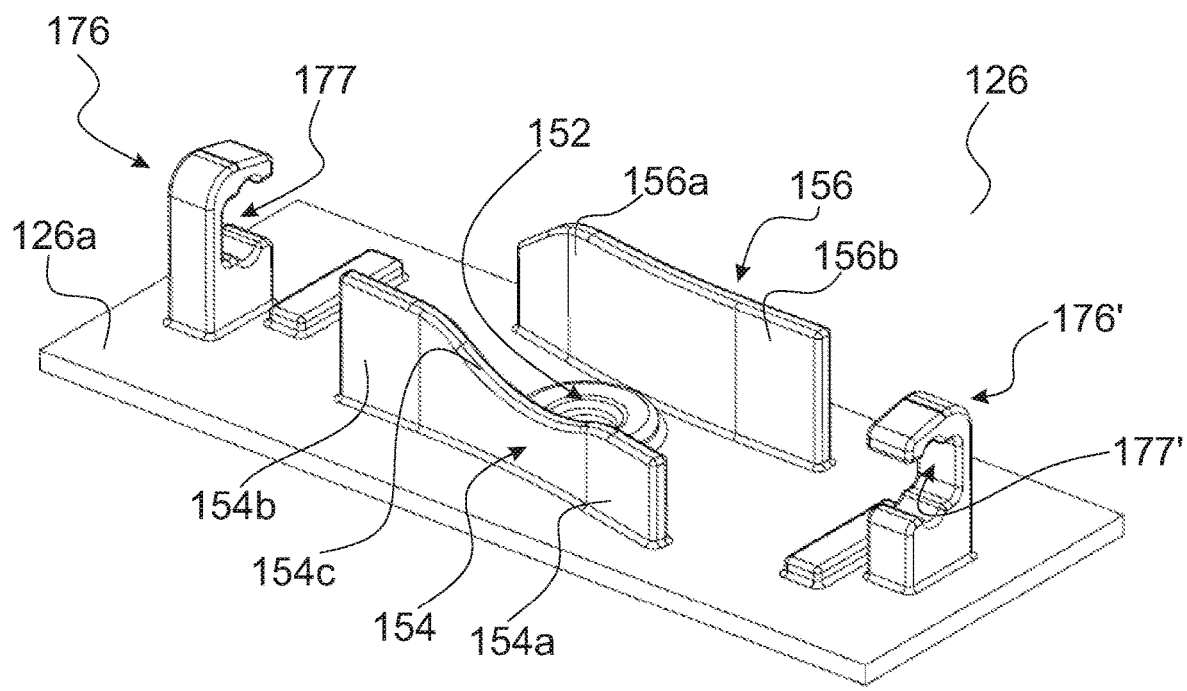
FIG. 10 is a perspective view of the platform of the second embodiment.
Figure 11:
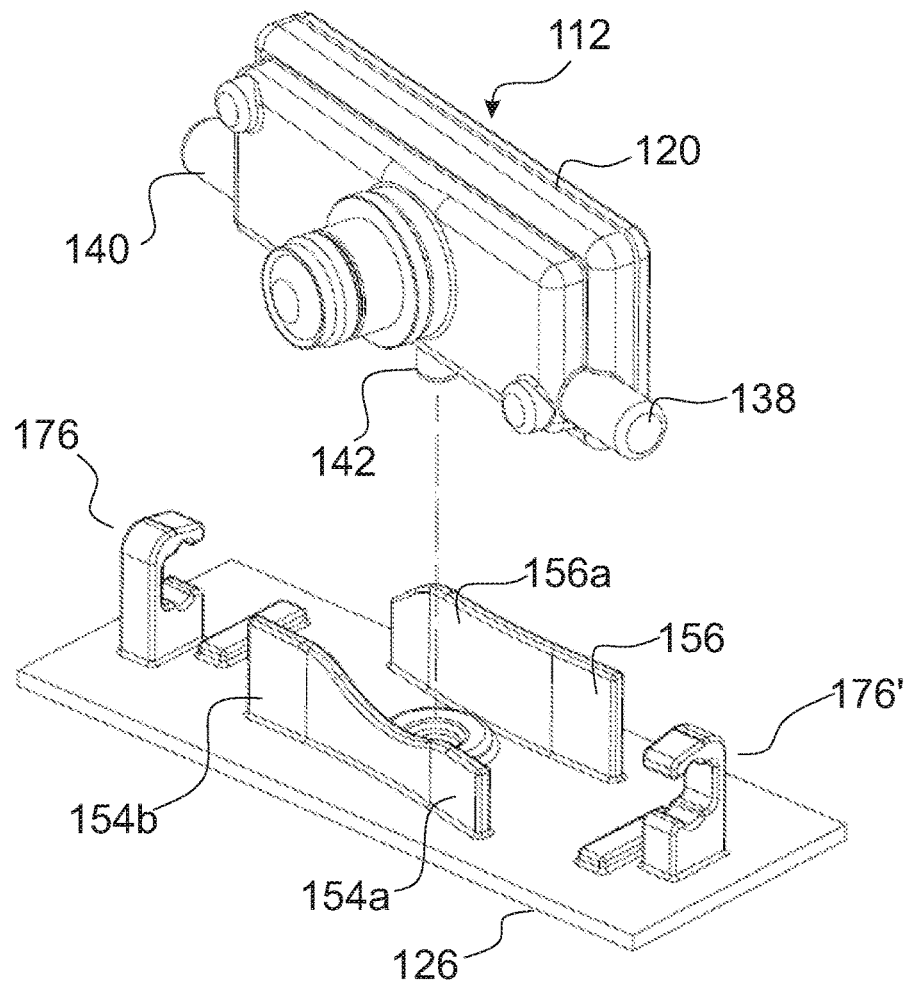
FIG. 11 is a perspective view showing the positioning members of the camera and platform in alignment.
Figure 12:
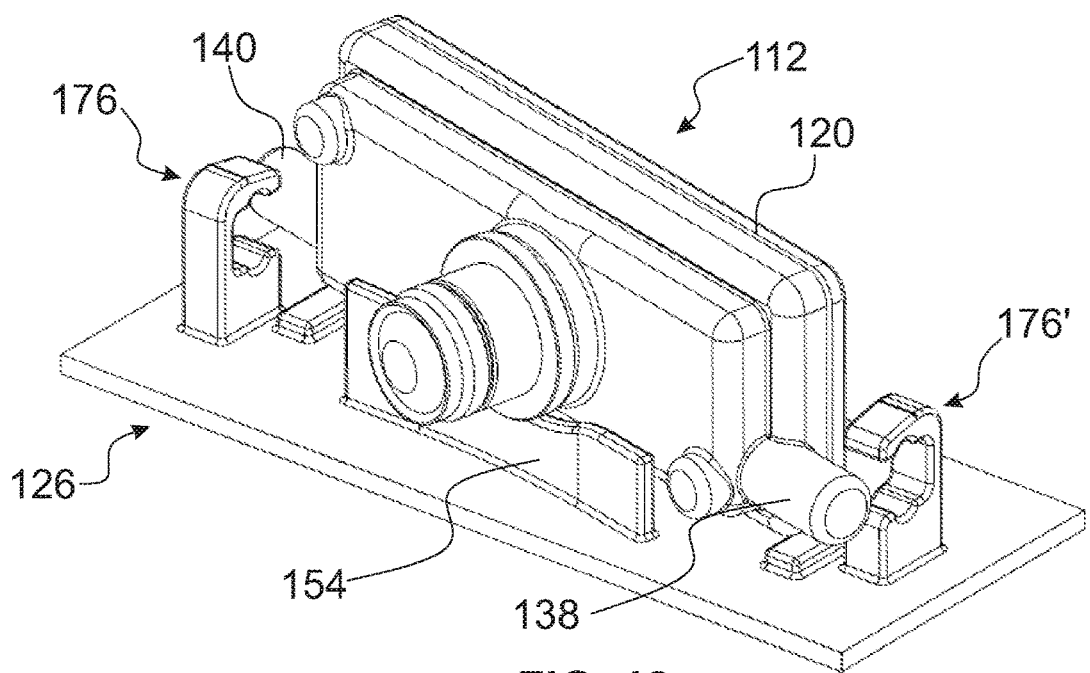
FIG. 12 is a perspective view of the camera in receiving position on the platform of FIG. 10.
Figure 13:
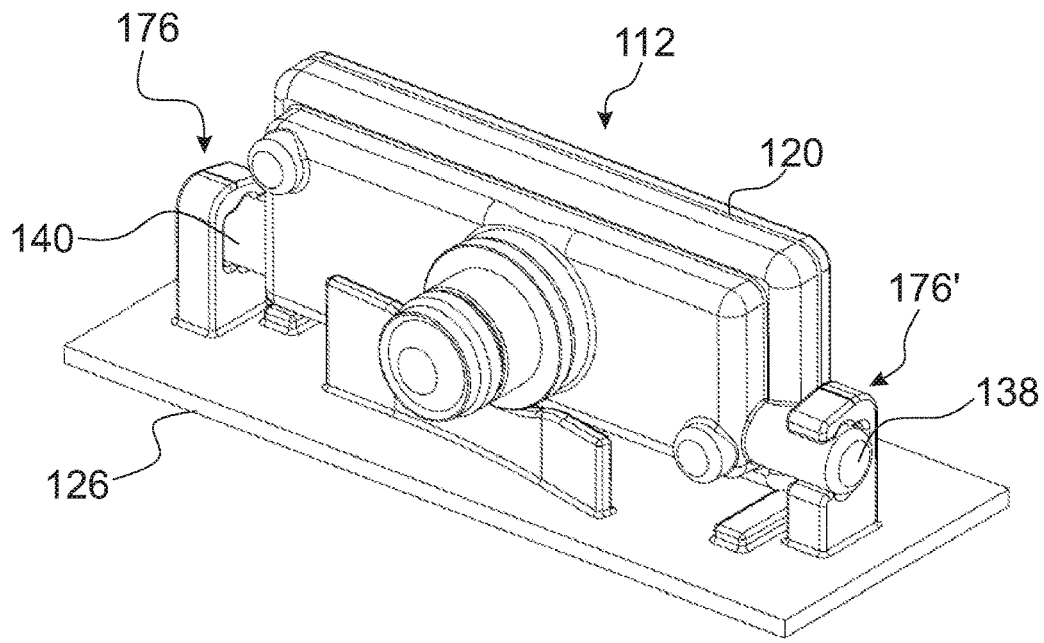
FIG. 13 is a perspective view of the camera in fixed position on the platform of FIG. 10.

In FIG. 10 one will recognize platform 126 with its positioning means, i.e. cavity/bore 152; a pair of releasable fixation members are indicated 176 and 176'. As it will appear from the following Figures, the assembly of the camera is carried out in a similar manner as in the previous embodiment: the camera is first positioned on the platform 126 with the positioning pin 142 in positioning bore 152, i.e. in the receiving position of FIG. 12, and from there the camera is pivoted (in this view in counterclockwise direction), to engage the pins 138, 140 with the fixation members 176 and 176' to bring the camera in the fixed position of FIG. 13.

Compared to the embodiment of FIGS. 1 to 6, the principal changes are the location of the positioning pin 142 on the camera housing and the design of the releasable fixing means 176 and 176'.

Since the positioning pin 142 is extending directly from the top edge 124a of the housing 120, the positioning cavity 152 is located in-between front and rear guide walls 154 and 156. That is, the rear guide wall 156 is not divided in two spaced portions by the positioning cavity 152.

Here again, the rear guide wall 156 comprises a first portion 156a defining the angular position of the receiving position and second portion 156b delimiting the fixed position. Similarly, front guide wall 154 comprises a first portion 154a corresponding to the angular position of the camera in the receiving position and a second portion 154b delimiting the fixed position. The front wall 154 has a shaped top edge 154c to accommodate the camera lens 118.

In the present variant the releasable fixation members 176 and 176' are made from plastic and define a retainer groove 177, 177' with snap-fit function; they are identical in design. As seen in FIG. 10 and in more detail in FIG. 14, fixation member 176, 176' comprises a base portion 178 connected to platform 126 and a flexible/resilient L-shaped finger 180 extending from the base portion to define the retainer groove. The groove is shaped as a U or C, being defined by the upper edge 178a of the base portion (opposite surface 126a), an upright portion of finger 180a and a terminal portion of finger 180b extending parallel to upper edge.

Figure 14:
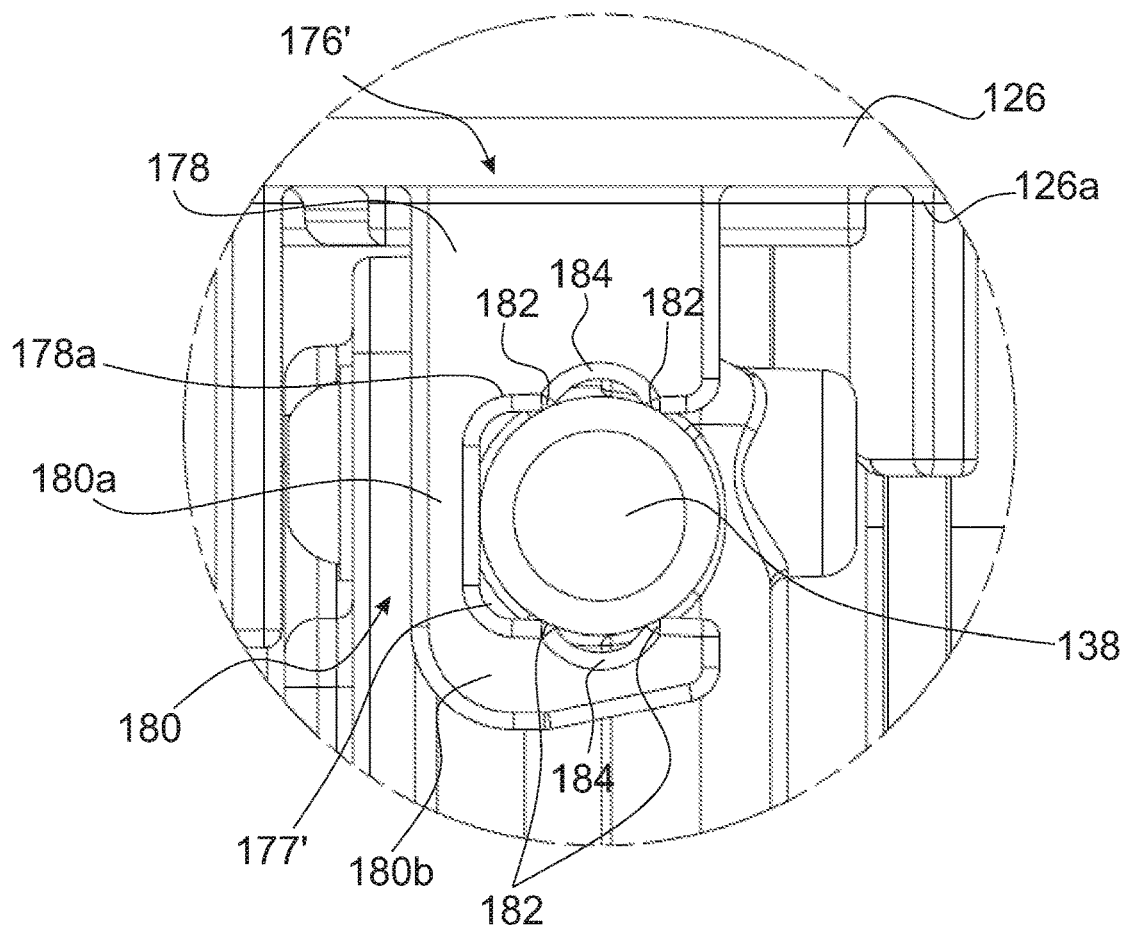
FIG. 14 is a detail of the fixation member of the platform of FIG. 10.

To provide the snapping function, blocking ribs or beads, or sharp edges, designated 182, are provided on the terminal finger portion 180b and on the upper edge 178a, in facing relationship. These ribs 182 are provided to engage with inner and outer sides (relative to the groove inlet) of the pin 138, thereby stably holding the pin 138 inside groove 177', as illustrated in FIG. 14.

In the illustrated embodiment, the ribs or sharp edges 182 are obtained by providing a recess 184 in the facing surfaces of finger portion 180b and upper edge 178a. Preferably, in the fixed position the pin 138 is also in contact with the base of the groove, i.e. with raised finger portion 180a.

Figure 15:
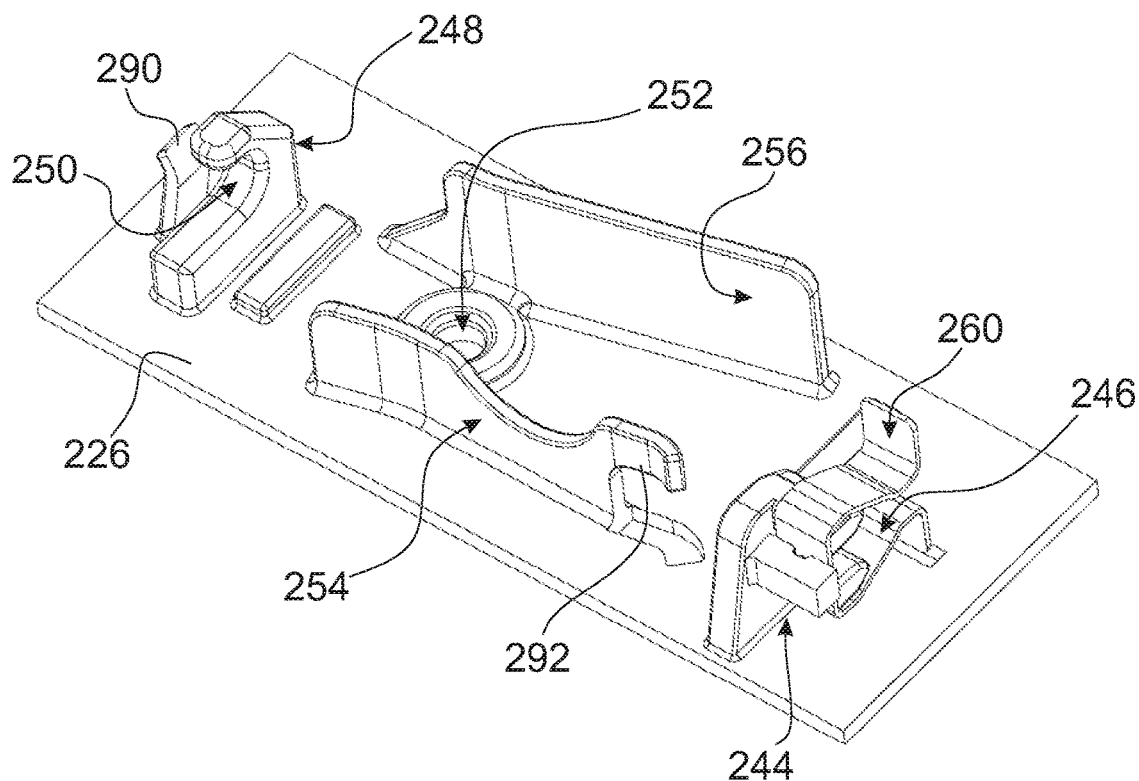
FIG. 15 is a perspective view of the platform according to a third embodiment.
Figure 16:
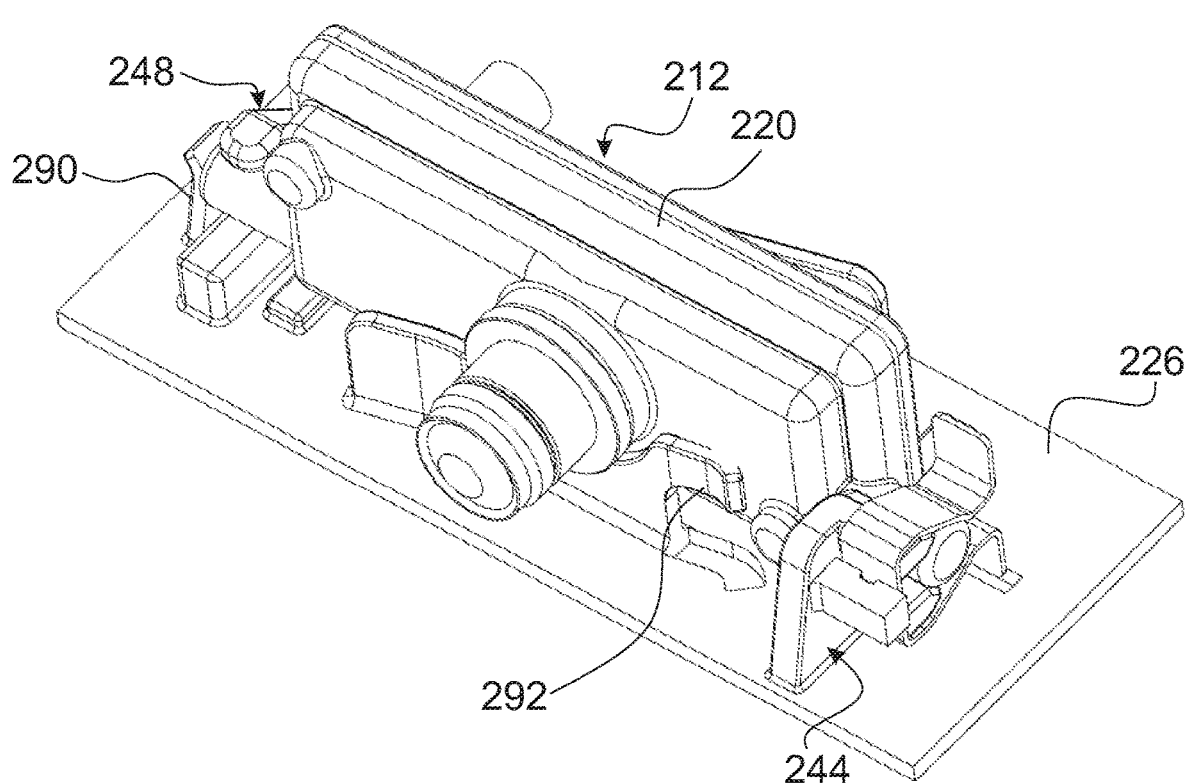
FIG. 16 is a perspective view of the camera in fixed position on the platform of FIG. 15.

Optional elastic members may be provided to compensate for tolerances. These will be explained in relation to still another design of the platform represented in FIGS. 15 and 16. As will be seen, the platform 226 is designed to cooperate with the camera of FIG. 9 but uses the fixation member 244 and support member 248 of FIG. 2.

Accordingly, reference signs of FIG. 9 are used for the camera and reference signs of FIG. 2, augmented by 200, are used for like elements on the platform.

The pivoting cavity 252 is placed in-between guide walls 254 and 256. The camera 112 is assembled to the platform 226 by inserting positioning pin 142 into cavity 252 and turning the camera about rotation axis R to engage the pins 138 and 140 into respective grooves 246 and 250.

An elastic tab 290 is arranged along external edge 228 to exert a force on pin 140 in the direction of Axis P, towards fixation member 248. Another elastic tab 292 is provided on the front guide wall 254 to press on the camera front side in fixed position.

In the above embodiments, the platform 26, 126, 226 can be manufactured from any appropriate plastic material. The features on the platform (fixing/support members and guide walls) can be conveniently integrally formed with the platform plate, e.g. by injection molding, or fixed thereto. For the fixation member 44 the holding member 62 is made from plastic whereas the spring clip is made from appropriate metal, e.g. steel/spring steel.

While this invention has been described in terms of the preferred embodiments thereof, it is not intended to be so limited, but rather only to the extent set forth in the claims that follow.

We claim:

1. A module and support structure assembly for mounting on the windscreen of a passenger compartment of an automotive vehicle, comprising:
   a module having a housing;
   a support structure adapted to carry said module, the housing and support structure comprising first fixation members and second fixation members cooperating with each other for releasable fixing by snapping said module to said support structure, wherein:
   said housing and support structure further comprise:
   cooperating first and second positioning members that are configured to define a receiving position for the module on the support structure, in which the module is not fixed, and to assist in a guided fashion engagement of the first fixation member and the second fixation member to bring said module in a fixed position; and
   a pair of positioning walls that are arranged on the support structure and spaced to accommodate the module,
   the second positioning member is located on a surface of a platform of the support structure and is further located in between the positioning walls or is separating one of the positioning walls into two portions, and
   the module comprising a positioning pin, the platform comprising a tab protruding from the surface of the platform and configured to engage the positioning pin in the fixed position and exert a force on the positioning pin in the direction towards the first and second fixation members when in the fixed position.

2. The assembly according to claim 1, wherein the positioning members comprise a protrusion and a cavity, wherein said protrusion is capable of rotation in said cavity so that said module is brought by pivoting about a rotating axis (R) from said receiving position into said fixed position.

3. The assembly according to claim 2, wherein said cavity is provided in said support structure and said positioning pin fitting into said cavity, wherein said position is received within said cavity.

4. The assembly according to claim 1, wherein the first fixation members include a groove with snap-fit function for the positioning pin.

5. The assembly according to claim 4, wherein said positioning pin extends in a direction transversal, in particular perpendicular, to a rotation axis (R).

6. The assembly according to claim 1, wherein said module engages said positioning in said fixed position with a snap-fit function, in a groove of a supporting member or in a groove of the first fixation member.

7. The assembly according to claim 6, wherein the positioning pin comprises two pins that are provided on opposite portions of said housing and extend along a respective axis transverse to a rotation axis (R), perpendicular thereto, and wherein two grooves are provided that have openings facing in opposite directions.

8. The assembly according to claim 2, wherein said support structure comprises the platform with the first fixation member and the second fixation member, wherein said rotation axis (R) is substantially perpendicular to said platform and wherein the grooves have an inlet region oriented such that it lies in a plane parallel to said platform.

9. The assembly according to claim 8, wherein said two pins extend along a same axis (P) that passes through said positioning cavity.

10. The assembly according to claim 1, wherein the support structure comprises a bracket portion, in particular connected to said platform, for attachment to a vehicle windscreen; and wherein said bracket portion is configured so that in use, said platform lies within +/−30° from the horizontal.

11. The assembly according to claim 7, wherein said housing has a rectangular shape and has opposing front and rear faces, opposing lateral edges, and opposing top and bottom edges, wherein said two pins protrude beyond the opposing lateral edges, and wherein the positioning pin is arranged to protrude beyond said top edge.

* * * * *